(12) United States Patent
Shikanai et al.

(10) Patent No.: US 10,597,103 B2
(45) Date of Patent: Mar. 24, 2020

(54) SADDLE-TYPE VEHICLE

(71) Applicant: HONDA MOTOR CO., LTD., Tokyo (JP)

(72) Inventors: Shimpei Shikanai, Saitama (JP); Nobutaka Wakita, Saitama (JP); Masahiro Kontani, Saitama (JP); Takahiko Shimizu, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 37 days.

(21) Appl. No.: 16/075,456

(22) PCT Filed: Feb. 5, 2016

(86) PCT No.: PCT/JP2016/053584
§ 371 (c)(1),
(2) Date: Aug. 3, 2018

(87) PCT Pub. No.: WO2017/134832
PCT Pub. Date: Aug. 10, 2017

(65) Prior Publication Data
US 2019/0039672 A1 Feb. 7, 2019

(51) Int. Cl.
*B62J 23/00* (2006.01)
*B62M 7/02* (2006.01)
(Continued)

(52) U.S. Cl.
CPC .............. *B62J 23/00* (2013.01); *B62J 9/001* (2013.01); *B62J 25/00* (2013.01); *B62J 27/00* (2013.01);
(Continued)

(58) Field of Classification Search
CPC ... B62J 23/00; B62J 27/00; B62J 9/001; B62J 25/00; B62M 7/02; B62K 2202/00; B62K 11/04
See application file for complete search history.

(56) References Cited

U.S. PATENT DOCUMENTS 5,107,949 A 4/1992 Gotoh et al.
6,068,075 A 5/2000 Saiki
(Continued)

FOREIGN PATENT DOCUMENTS

JP H02-169380 A 6/1990
JP H09-249169 A 9/1997
(Continued)

OTHER PUBLICATIONS

Jan. 14, 2019, European Search Report issued for related EP application No. 16889317.0.
(Continued)

*Primary Examiner* — Darlene P Condra
(74) *Attorney, Agent, or Firm* — Paratus Law Group, PLLC (57) ABSTRACT

A saddle-type vehicle includes a vehicle body frame, a pillion step supported by the vehicle body frame and on which a foot of a passenger is to be placed, a passenger seat supported by the vehicle body frame and on which the passenger is to be seated, an exhaust pipe configured to guide an exhaust gas discharged from an engine to an outside, an exhaust pipe cover covering the exhaust pipe from a lateral outside thereof, and a guard body extending laterally outward from the vehicle body frame, wherein the guard body is disposed below the pillion step and to protrude laterally from an opening part formed in the exhaust pipe cover.

6 Claims, 10 Drawing Sheets

(51) Int. Cl.
*B62J 25/00* (2020.01)
*B62J 27/00* (2020.01)
*B62J 9/00* (2020.01)
*B62K 11/04* (2006.01)

(52) U.S. Cl.
CPC ............. *B62M 7/02* (2013.01); *B62K 11/04* (2013.01); *B62K 2202/00* (2013.01)

(56) References Cited

U.S. PATENT DOCUMENTS

| | | | |
|---|---|---|---|
| 6,234,266 | B1 | 5/2001 | Saiki |
| 2005/0081516 | A1 | 4/2005 | Inaoka et al. |
| 2005/0267674 | A1 | 12/2005 | Suzuki et al. |
| 2008/0169134 | A1* | 7/2008 | Tomolillo ................. B60J 1/04 180/6.24 |
| 2008/0169627 | A1 | 7/2008 | Bagnariol et al. |
| 2014/0152045 | A1 | 6/2014 | Tako et al. |
| 2016/0107715 | A1* | 4/2016 | Ishida .................... B62K 11/12 180/219 |
| 2016/0200391 | A1* | 7/2016 | Ishida .................. B62K 25/283 180/227 |
| 2017/0036727 | A1* | 2/2017 | Shigihara ............... B60K 13/04 |

FOREIGN PATENT DOCUMENTS

| | | |
|---|---|---|
| JP | H11-117733 A | 4/1999 |
| JP | 2005-067552 A | 3/2005 |
| JP | 2005-343227 A | 12/2005 |
| JP | 2009-040364 A | 2/2009 |
| JP | 2014-108650 A | 6/2014 |
| JP | 2015-030373 A | 2/2015 |

OTHER PUBLICATIONS

May 10, 2016, International Search Opinion issued for related PCT application No. PCT/JP2016/053584.
May 10, 2016, International Search Report issued for related PCT application No. PCT/JP2016/053584.

* cited by examiner

SADDLE-TYPE VEHICLE

CROSS REFERENCE TO PRIOR APPLICATION

This application is a National Stage Patent Application of PCT International Patent Application No. PCT/JP2016/053584 (filed on Feb. 5, 2016) under 35 U.S.C. § 371, which is hereby incorporated by reference in its entirety.

TECHNICAL FIELD

The present invention relates to a saddle-type vehicle such as a motorcycle.

BACKGROUND ART

A conventional saddle-type vehicle, such as a motorcycle, includes a guard body which protrudes laterally outward to protect a vehicle body. Patent Document 1 discloses in the drawings a structure including a guard body which is provided rearward of a pillion step on which a foot of a passenger is to be placed, above a muffler and forward of a saddlebag.

PRIOR ART DOCUMENT

Patent Document

Patent Document 1: JP-A-2005-343227

SUMMARY OF INVENTION

Problems to be Solved by Invention

Since the guard body disclosed in Patent Document 1 is disposed rearward of the pillion step, above the muffler and forward of the saddlebag, a position of the pillion step is restricted by the guard body, and a degree of freedom of the arrangement of the pillion step is low. Further, since the guard body is disposed above the muffler, a lateral protrusion amount of the guard body is large.

The present invention provides a saddle-type vehicle which can enhance the degree of freedom of the arrangement of a pillion step and reduce the size and weight of a guard body.

Means for Solving the Problems

The present invention provides the following aspects.

According to a first aspect, there is provided a saddle-type vehicle including:

a vehicle body frame;

a pillion step supported by the vehicle body frame and on which a foot of a passenger is to be placed;

a passenger seat supported by the vehicle body frame and on which the passenger is to be seated;

an exhaust pipe configured to guide an exhaust gas discharged from an engine to an outside;

an exhaust pipe cover covering the exhaust pipe from a lateral outside thereof; and a guard body extending laterally outward from the vehicle body frame, wherein the guard body is disposed below the pillion step and to protrude laterally from an opening part formed in the exhaust pipe cover.

According to a second aspect, the saddle-type vehicle of the first aspect, further includes:

a guard body cover covering the guard body from a lateral outside thereof, and the guard body cover is fixed to the exhaust pipe cover.

According to a third aspect, in the saddle-type vehicle of the second aspect, a saddlebag configured to accommodate luggage is disposed rearward and upward of the guard body cover.

According to a fourth aspect, in the saddle-type vehicle of the second or third aspect, the guard body cover is different from the exhaust pipe cover in color and material.

According to a fifth aspect, the saddle-type vehicle of any one of the second to fourth aspects, the guard body cover is supported on the exhaust pipe cover via an elastic member.

According to a sixth aspect, in the saddle-type vehicle of any one of the first to fifth aspects, an expansion chamber is provided on a downstream side of the exhaust pipe, an exhaust pipe connecting portion having a diameter smaller than that of the expansion chamber is connected to a front-lower portion of the expansion chamber, and the guard body laterally extends below an upper side of the expansion chamber and above the exhaust pipe connecting portion.

Effects of Invention

According to the first aspect, since the guard body is disposed below the pillion step and to protrude laterally from the opening part formed in the exhaust pipe cover, a position at which the guard body is provided can be lowered according to an arrangement position of the exhaust pipe. Therefore, a lateral protrusion amount of the guard body can be suppressed, and the size and weight of the guard body can be reduced.

According to the second aspect, since the guard body cover covering the guard body from the lateral outside thereof is provided as a member separate from the exhaust pipe cover, only the guard body cover needs to be replaced when the guard body cover is damaged, so that repair costs can be reduced. Further, since the guard body cover is fixed to the exhaust pipe cover, approach thereto can be easier in assembling, maintenance or the like and workability is better.

According to the third aspect, since the saddlebag which can accommodate luggage is disposed rearward and upward of the guard body cover, the exhaust pipe and the saddlebag can be protected by the guard body and the guard body cover. Further, a plurality of portions can be protected with the guard body and the guard body cover, so that there is no need to provide protection means unnecessarily. Accordingly, an inexpensive structure can be obtained.

According to the fourth aspect, since the guard body cover is formed of a color and material different from that of the exhaust pipe cover, a periphery of the exhaust pipe can be configured to be a unique appearance.

According to the fifth aspect, since the guard body cover is supported on the exhaust pipe cover via the elastic member, a buffering function can be provided between the guard body cover and the exhaust pipe cover, and the exhaust pipe cover can be prevented from being plastically deformed when an external force is applied to the guard body cover. Therefore, a protection performance of the exhaust pipe cover is improved.

According to the sixth aspect, the exhaust pipe connecting portion having a diameter smaller than that of the expansion chamber is connected to the front-lower portion of the expansion chamber, and the guard body laterally extends below the upper side of the expansion chamber and above the exhaust pipe connecting portion, so that the guard body can be disposed by utilizing a space formed by the exhaust pipe. As a result, parts can be disposed in a concentrated manner.

Further, since the guard body and the exhaust pipe are disposed to be as close as possible, the attachment position of the guard body can be lowered, the lateral protrusion amount of the guard body can be suppressed, and the size and weight of the guard body can be reduced.

DESCRIPTION OF EMBODIMENTS

Hereinafter, a motorcycle which is a saddle-type vehicle according to an embodiment of the present invention will be described with reference to FIG. 1 to FIG. 9. Incidentally, the drawings should be seen based on a direction of reference numerals. In the following description, front, rear, left, right, upper, and lower directions are described according a view from a driver. In the drawings, a front side of the vehicle is denoted by Fr, a rear side is denoted by Rr, a left side is denoted by L, a right side is denoted by R, an upper side is denoted by U, and a lower side is denoted by D.

Figure 1:
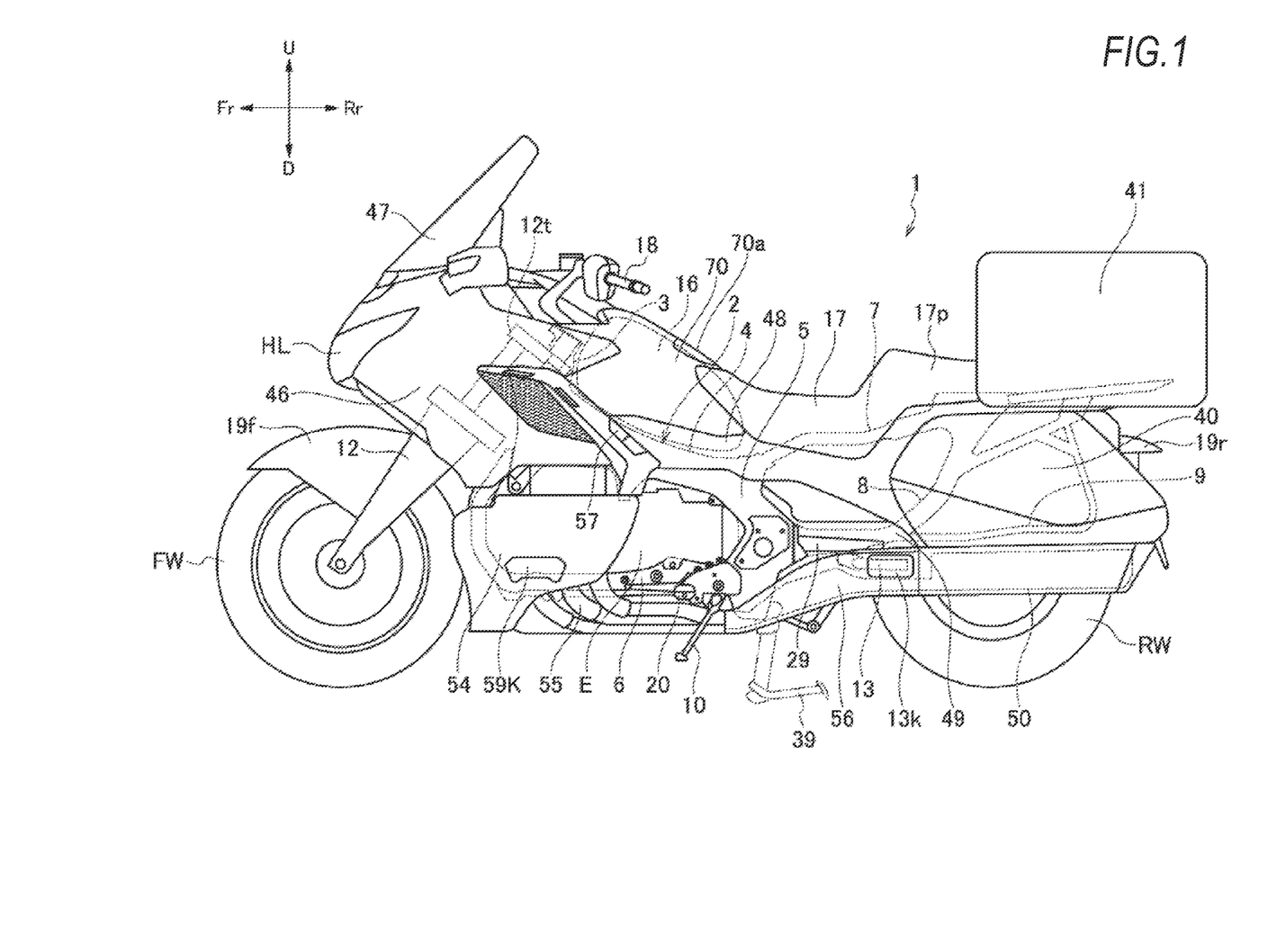
FIG. 1 is a left side view of a motorcycle according to an embodiment of a saddle-type vehicle of the present invention.

As shown in FIG. 1, a vehicle body frame 2 which is a framework portion in a motorcycle 1 includes a pair of left and right main frames 4 extending rearward and downward from a head pipe 3; a pair of pivot frames 5 extending downward from the main frames 4; a pair of lower frames 6 extending downward from the head pipe 3 and then extending rearward so as to be connected to a lower portion of the pivot frames 5; a pair of seat frames 7 extending rearward and then extending obliquely upward from the pivot frames 5; a pair of rear-lower frames 8 for supporting the seat frames 7 from below; and bag frames 9 for supporting saddlebags 40 (described later) or the like on a rear side of the rear-lower frames 8.

The head pipe 3 is attached to a top bridge 12t of a front fork 12 to which a front wheel FW is steerable attached, and steering handles 18 are attached to the top bridge 12t. A side stand 10 for supporting the vehicle body during parking of the vehicle is provided only on a left side of the vehicle body frame 2 in a substantially center region in a vehicle front-rear direction on the lower portion side thereof, and a main stand 39 is attached to a rear side of the side stand 10. Further, in a directly front side of the side stand 10, main steps 20 on which feet of a driver are to be placed are provided to protrude to the left and right sides, and pillion steps 29 on which feet of a passenger are to be placed and which are provided obliquely rearward and upward of the main steps 20 are attached to protrude to the left and right sides (see FIG. 2).

Figure 7:
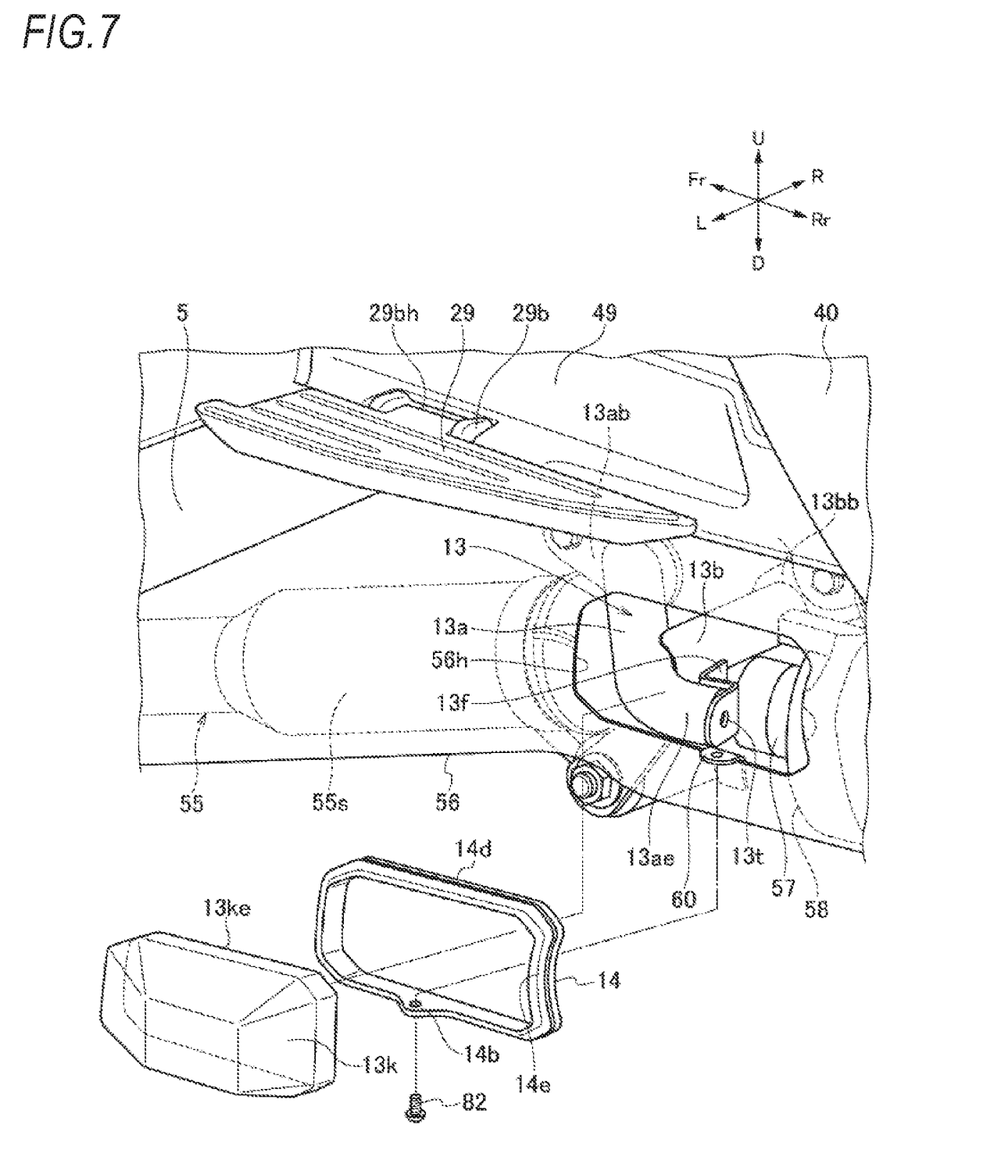
FIG. 7 is an enlarged perspective view showing the attachment state of the guard body.

As shown in FIG. 7, the pillion step 29 is supported by a pillion step bracket 29b, which is attached to the rear-lower frame 8, via a hinge portion 29bh such that the pillion step 29 is configured to be movable between a laterally protruding state and a folded state.

Returning to FIG. 1, a fuel tank 16 is disposed between the main frames 4. At a rear-upper side of the fuel tank 16, a driver seat 17 on which a driver is to be seated and a passenger seat 17p on which the passenger is to be seated are supported on the seat frames 7 with a step in a front-rear direction. Further, a trunk box 41 is provided rearward of the passenger seat 17p.

Figure 3:
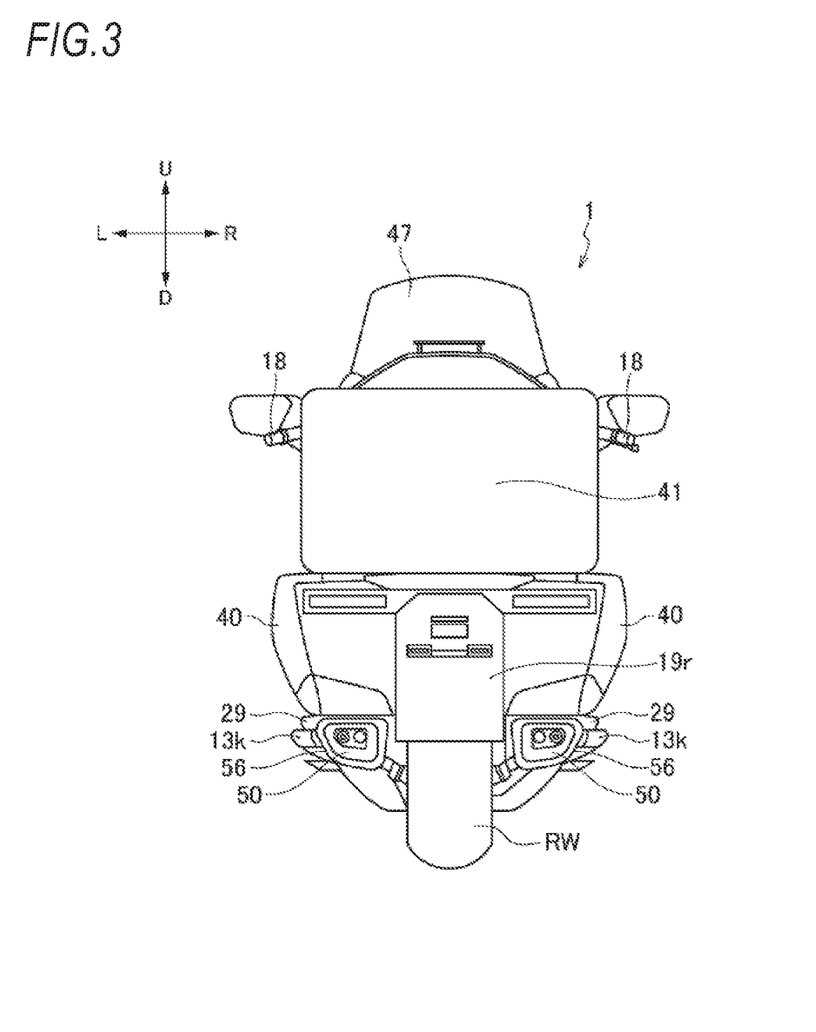
FIG. 3 is a rear view of the motorcycle shown in FIG. 1 as viewed from behind.

An engine E is mounted in a space surrounded by the main frames 4, the pivot frames 5 and the lower frames 6. An exhaust pipe 55 extending obliquely rearward and downward from the engine E further extends rearward to be connected to a muffler 50. Further, a rear wheel RW is supported by the vehicle body frame 2 via a swing arm, a cushion unit, or the like (not shown). As shown in FIG. 3, the saddlebags 40 are provided on the left and right sides of the rear wheel RW respectively, and on a lower side of the saddlebag 40, the mufflers 50 are provided so as to sandwich the rear wheel RW.

Figure 2:
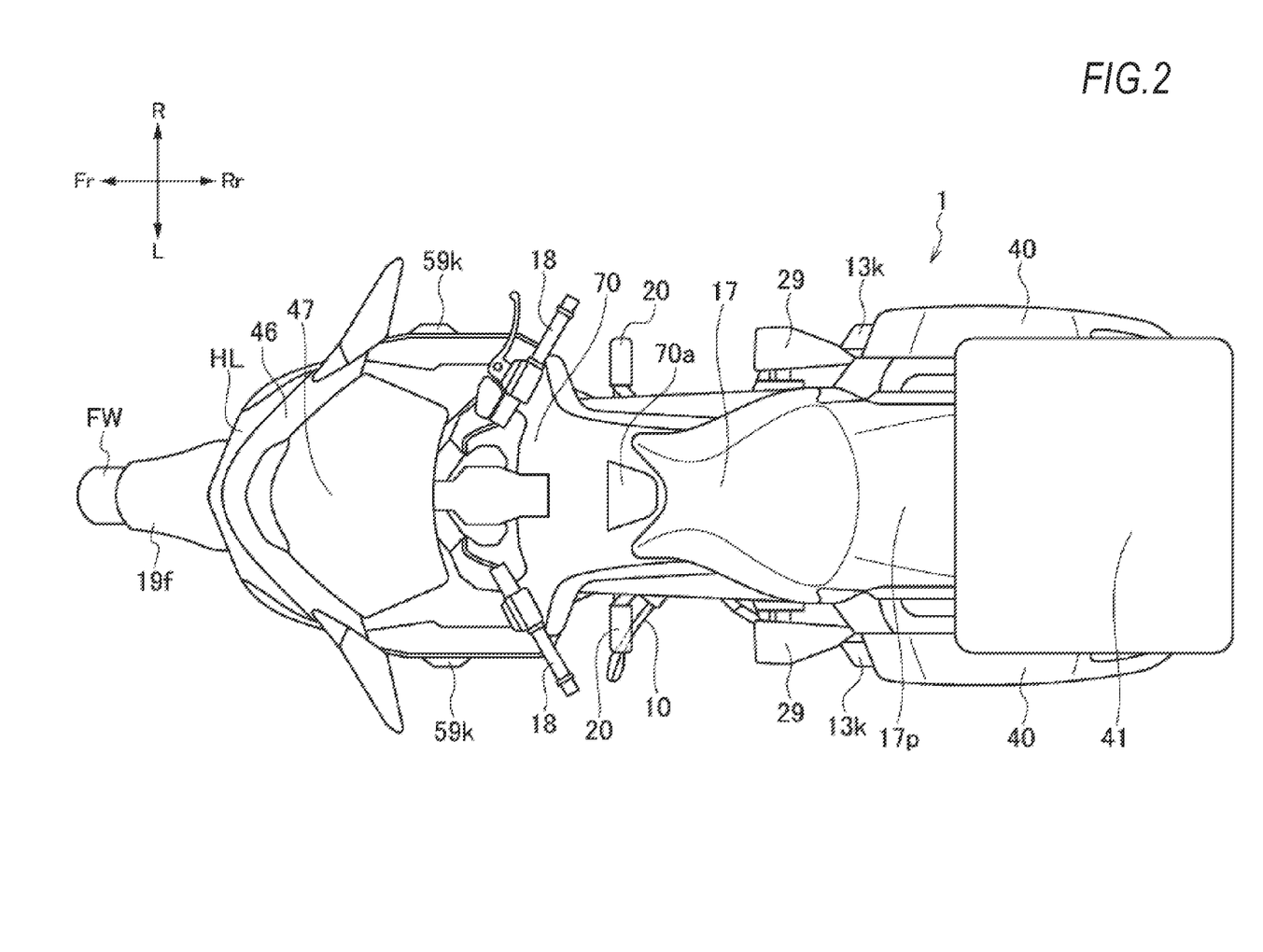
FIG. 2 is a plan view of the motorcycle shown in FIG. 1 as viewed from above.

An outer surface of the vehicle is covered by a cover member. Referring to FIG. 2, a headlight HL is provided at a center of a front portion of the vehicle, a front cowl 46 is provided so as to cover upper, lower, left and right sides of the headlight HL, and a front screen 47 is provided above the front cowl 46.

Side covers 48 for covering the main frames 4 and a lower side of the fuel tank 16, and lower side covers 49 disposed at a rear-lower portion of the side covers 48 are provided rearward of the front cowl 46. A top cover 70 is provided so as to cover the fuel tank 16. Further, head covers 54 for covering side surfaces of the engine E or the like are provided on a lower side of the front cowl 46.

A metal exhaust pipe cover 56 for covering the exhaust pipe 55 from a lateral outside thereof is provided on the exhaust pipe 55. The front wheel FW is covered by a front fender 19f from the above and the rear wheels RW is covered by a rear fender 19r from the above. In FIG. 1, the reference numeral 70a represents a fuel lid.

Here, in the vehicle body frame 2, a guard body 13 is attached to a lower end portion of the rear-lower frame 8. The guard body 13 is attached to each of the pair of left and right rear-lower frames 8 and has a structure of protruding laterally outward from the vehicle body frame 2.

In the following description, although only the guard body 13 attached to the left side of the vehicle will be described, the guard body 13 attached to the right side of the vehicle has the similar structure.

Figure 4:
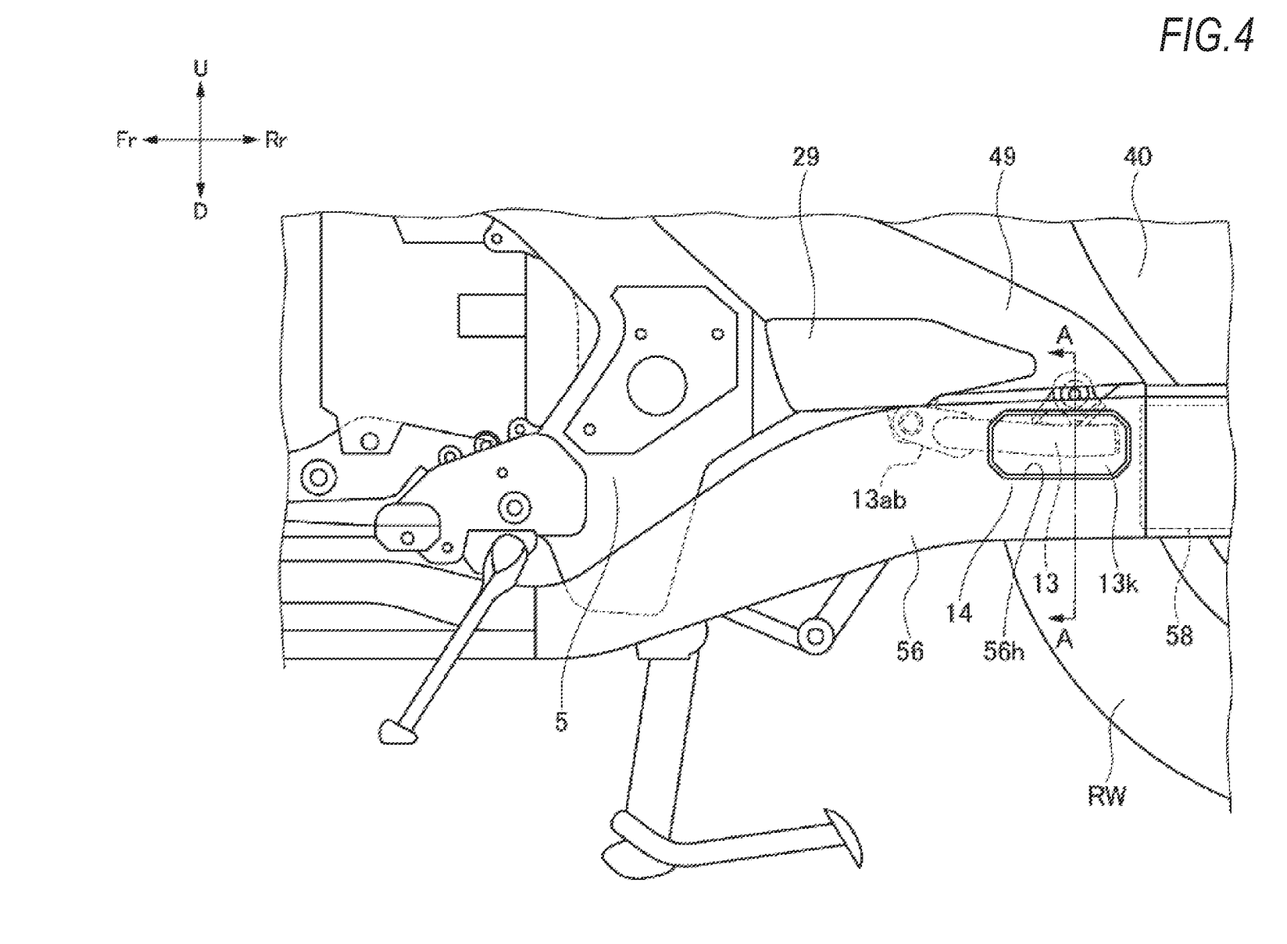
FIG. 4 is an enlarged side view of an exhaust pipe cover provided on the motorcycle shown in FIG. 1.

As shown in FIG. 4, the guard body 13 is disposed below the pillion step 29 on which a foot of a passenger is to be placed and forward of the saddlebag 40 which can accommodate luggage. Specifically, the guard body 13 is disposed at a position obliquely downward and rearward of the pillion step 29, obliquely forward and downward of the saddlebag 40, and overlapping with the exhaust pipe cover 56 in a side view.

Figure 6:
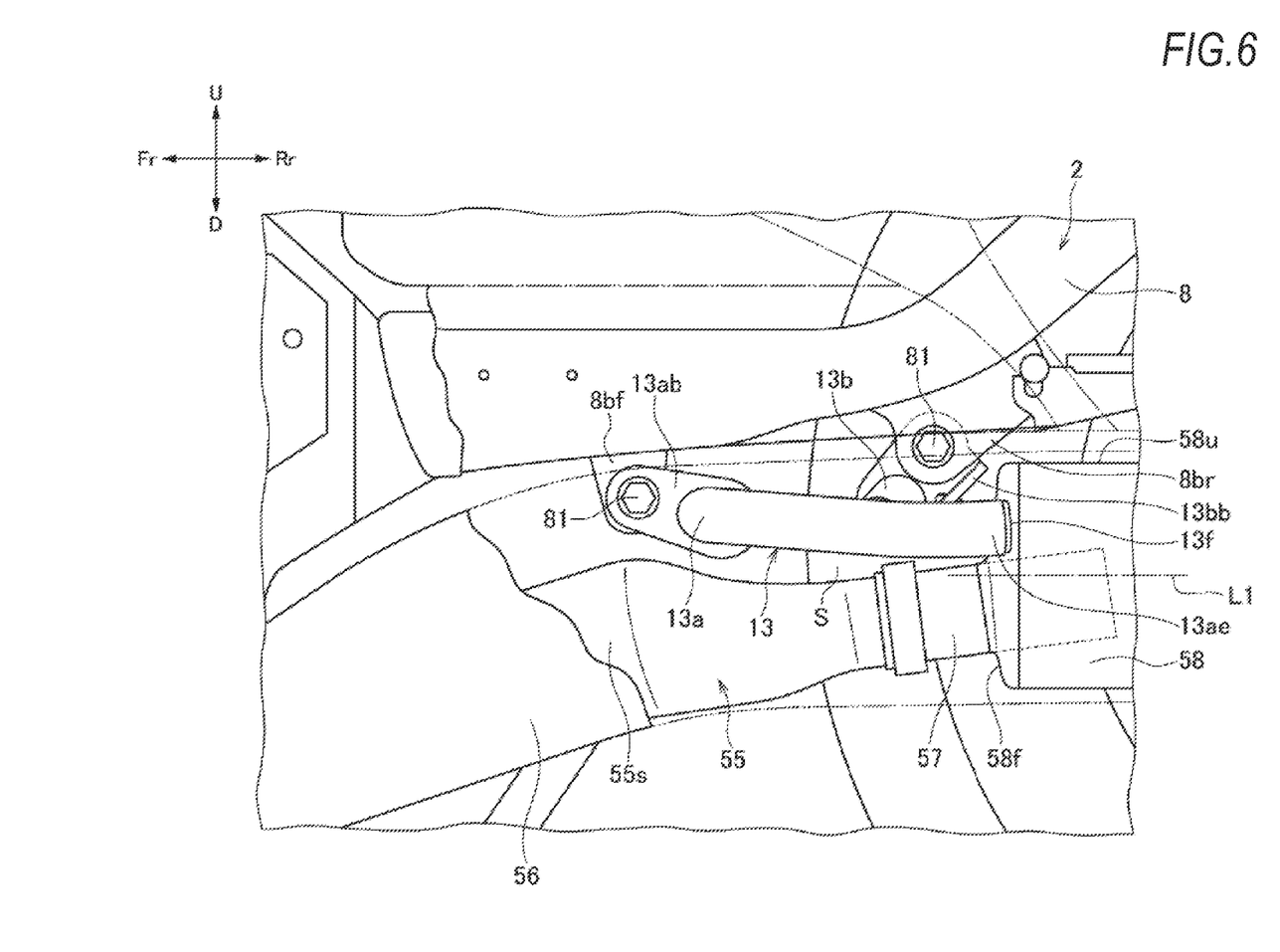
FIG. 6 is an enlarged side view showing an attachment state of the guard body while a part of the exhaust pipe cover is cut out.

As shown in FIG. 6, an expansion chamber 58 is provided on a downstream side of the exhaust pipe 55. The exhaust pipe 55 is connected to a front surface 58f of the expansion chamber 58 via an exhaust pipe connecting portion 57 having a diameter smaller than a diameter of the expansion chamber 58. A connecting position of the exhaust pipe connecting portion 57 is located below a center line L1 of the expansion chamber 58, that is, the exhaust pipe connecting portion 57 is connected to a front-lower portion of the expansion chamber 58. In the exhaust pipe 55, a catalyst storage portion 55s having a diameter larger than that of the exhaust pipe connecting portion 57 is provided forward of the exhaust pipe connecting portion 57.

Therefore, a recessed space S is formed above the exhaust pipe connecting portion 57, rearward of the catalyst storage portion 55s, and forward of the expansion chamber 58. The exhaust pipe cover 56 covers the catalyst storage portion 55s, the space S and the expansion chamber 58, and an opening part 56h is formed at a position corresponding to the space S (see FIG. 4).

Figure 8:
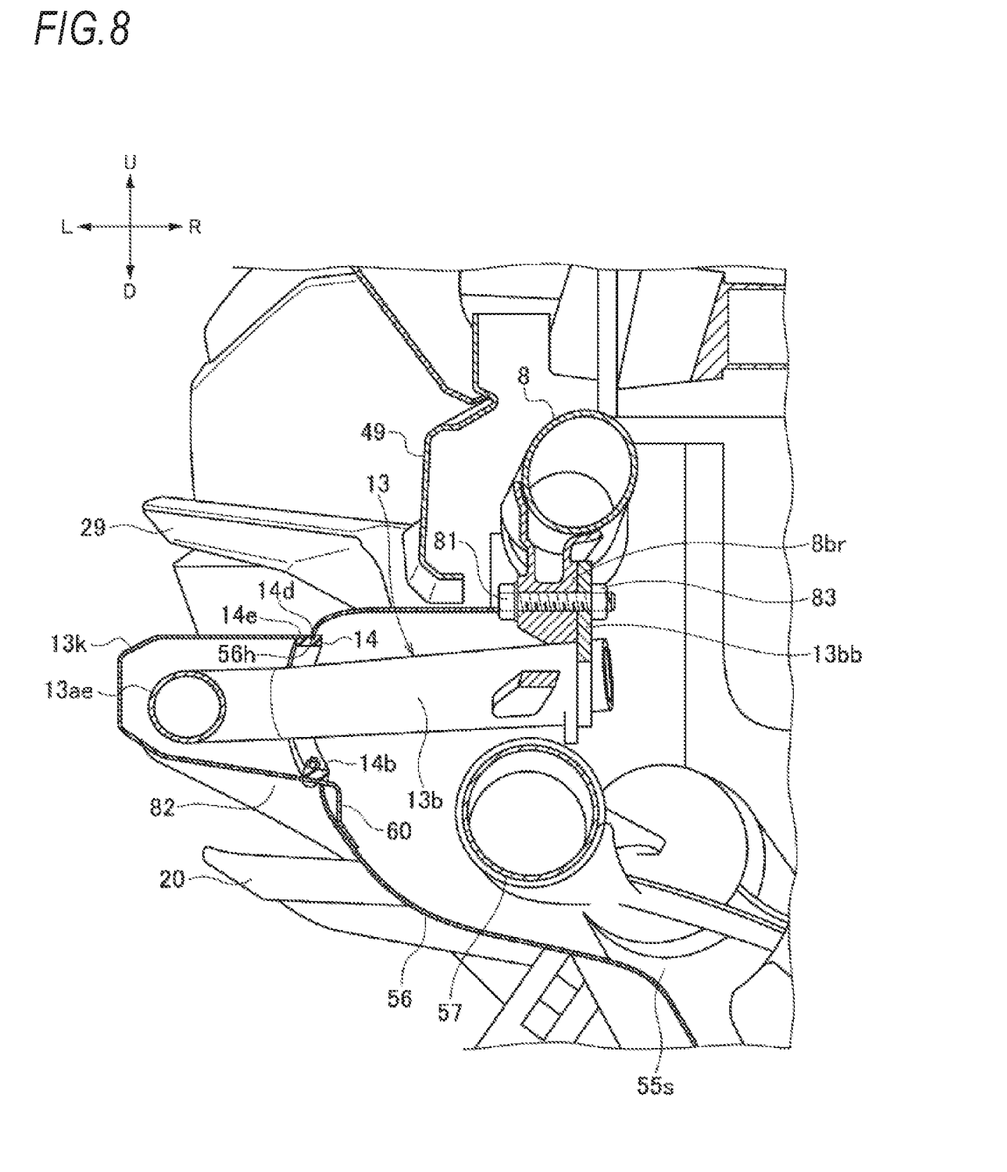
FIG. 8 is a cross sectional rear view taken along a line A-A in FIG. 4.

Referring to FIG. 8, the guard body 13 is provided in the space S such that a part of the guard body 13 passes through the opening part 56h of the exhaust pipe cover 56 to the lateral outside. That is, the guard body 13 is disposed at a position above the exhaust pipe connecting portion 57 and below an upper side 58u of the expansion chamber 58, and is provided to protrude from the exhaust pipe cover 56.

Figure 5A:
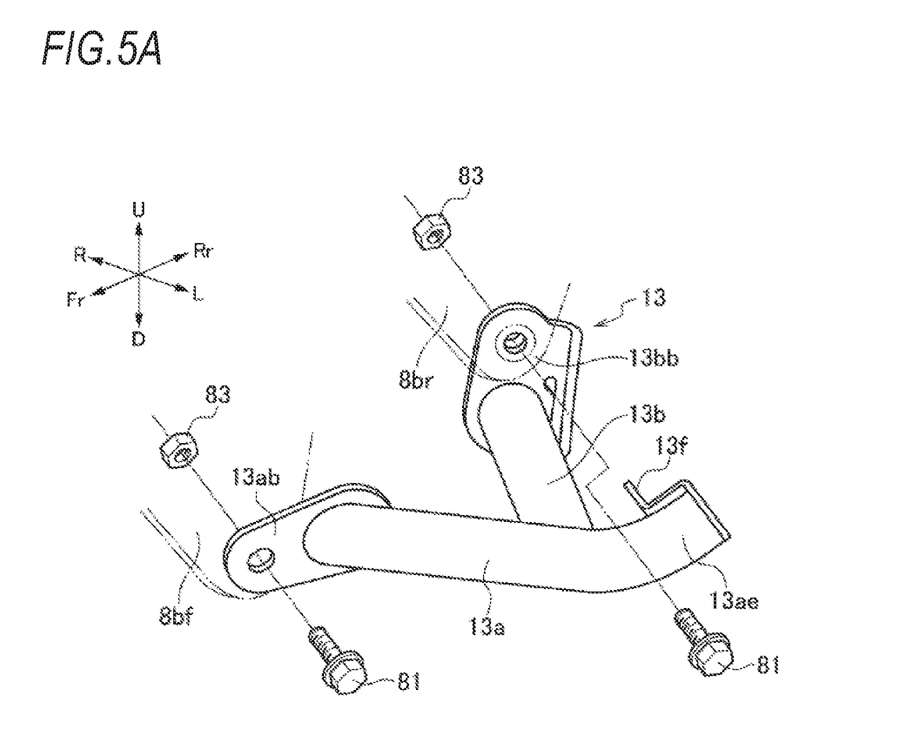
FIG. 5A is a perspective view of a guard body.
Figure 5B:
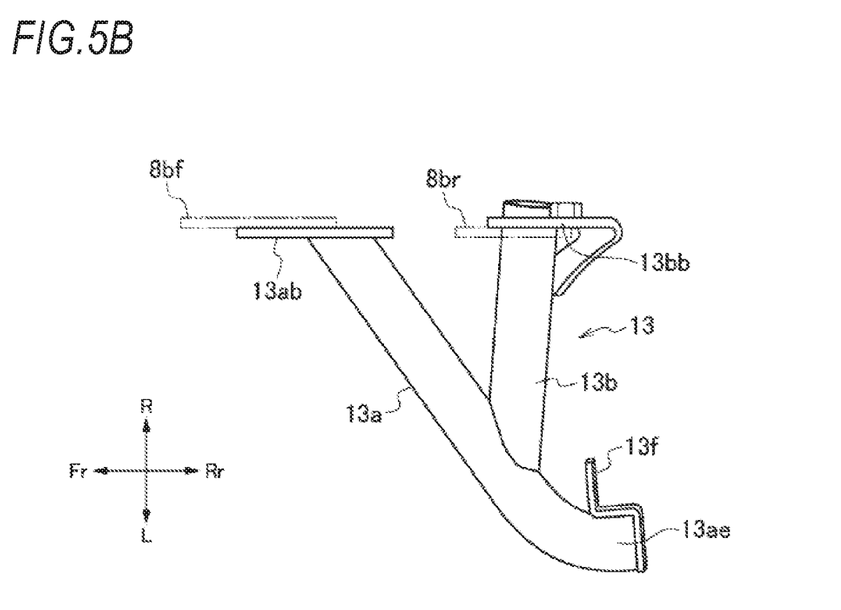
FIG. 5B is a plan view of the guard body as viewed from above the vehicle.

As shown in FIGS. 5A and 5B, the guard body 13 is formed of, for example, a pipe member having a circular cross section. The guard body 13 includes a first pipe portion 13a protruding laterally outward and extending obliquely rearward and a second pipe portion 13b connected to a middle part of the first pipe portion 13a in a longitudinal direction and has a substantially Y-shape in a plan view (see FIG. 5B). The first pipe portion 13 is provided with a first attachment portion 13ab as an attachment portion to the vehicle body frame 2. The second pipe portion 13h is provided with a second attachment portion 13bb as an attachment portion to the vehicle body frame 2. The first pipe portion 13a is curved such that a tip end portion 13ae thereof bulges toward a vehicle outside. Further, at a front end edge of the first pipe portion 13a, a plate-shaped locking portion 13f extends toward a vehicle inner side.

The first pipe portion 13a is fastened to a front side stay 8bf provided on the rear-lower frame 8 and the second pipe portion 13b is fastened to a rear side stay 8br provided rearward of the front side stay 8bf, via fastening bolts 81 and the nuts 83, respectively. Accordingly, the guard body 13 is securely fixed to the rear-lower frame 8 at two positions on the front and rear sides. Incidentally, in a state where a guard body cover 13k (described later) is removed, the locking portion 13f provided at the tip end portion 13ae can be used for fixing the vehicle at the time of transporting the vehicle or the like by hooking a string or the like.

As shown in FIGS. 7 and 8, although the guard body 13 is covered by the exhaust pipe cover 56 disposed outside the guard body 13, the tip end portion 13ae of the guard body 13 protrudes laterally outward from the opening part 56h provided in the exhaust pipe cover 56. A cup-shaped guard body cover 13k is attached to the opening part 56h via an elastic member 14. Thus, the guard body 13 is not exposed to the outside while being covered by the guard body cover 13k. Incidentally, the guard body cover 13k is preferably different from the exhaust pipe cover 56 in color and material. For example, the guard body cover 13k is formed of resin, so that color tone of the guard body cover 13k can be made different from the metal exhaust pipe cover 56.

The elastic member 14 has a substantially rectangular shape and includes an opening-part-side recessed portion 14d on an outer periphery thereof to be fitted to an edge portion of the opening part 56h, and a fixing portion 14b at a lower portion thereof to be fastened to a bracket 60 extending from an inner peripheral surface of the exhaust pipe cover 56 toward the opening part 56h. In a state where the opening-part-side recessed portion 14d is fitted into the edge portion of the opening part 56h, an outer peripheral portion of the elastic member 14 which is exposed from the opening part 56h is configured as a fitting portion 14e to be fitted to an edge portion 13ke of the guard body cover 13k. Accordingly, the elastic member 14 is supported on the bracket 60 via a screw 82 so as to be supported by the exhaust pipe cover 56, the opening-part-side recessed portion 14d is fitted to the edge portion of the opening part 56h, and the fitting portion 14e is fitted with the edge portion 13ke of the guard body cover 13k, so that the guard body cover 13k is elastically supported to the exhaust pipe cover 56. Incidentally, as shown in FIG. 7, a fastening portion 13t which is, for example, a screw hole is provided on a tip end surface of the tip end portion 13ae of the guard body 13, and the fastening portion 13t may be used for supporting the guard body cover 13k. Incidentally, the elastic member 14 and the guard body cover 13k may be formed integrally.

Returning to FIG. 1, an engine guard 59g for protecting the engine E is attached to the vehicle body frame 2 on a front-lower side of the lower frame 6. The engine guard 59g is attached to each of the pair of left and right lower frames 6 and is structured to protrude laterally outward from the vehicle body frame 2.

Figure 9:
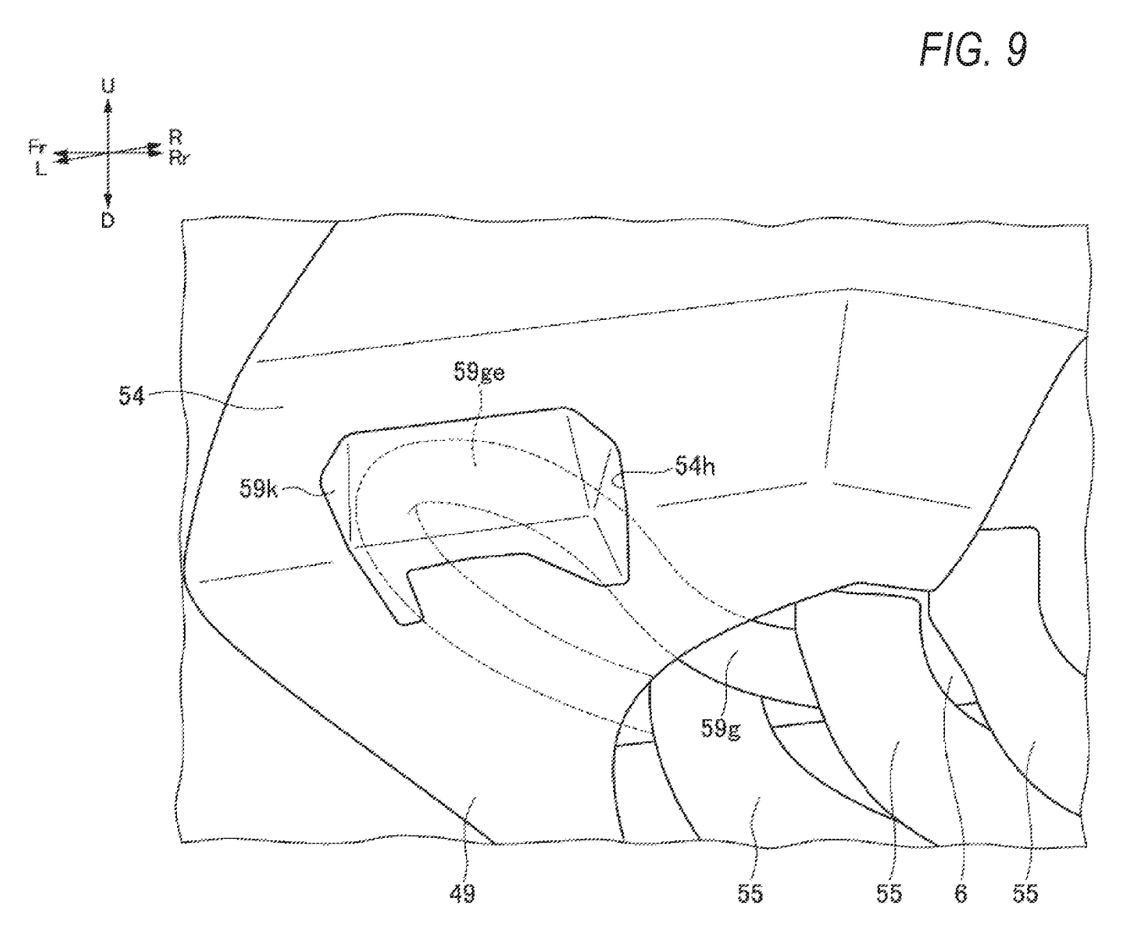
FIG. 9 is an enlarged perspective view of a portion of the motorcycle shown in FIG. 1 to which an engine guard is attached.

Specifically, as shown in FIG. 9, a tip end portion 59ge of the engine guard 59g protrudes to the lateral outside from an opening part 54h of the head cover 54 covering a part of the side surface of the engine E. An engine guard cover 59k is attached to the opening part 54h via an elastic member (not shown). The engine guard cover 59k is provided to extend substantially in parallel to the head cover 54 in a side view along the vehicle front-rear direction. Accordingly, since the engine guard cover 59k covering the engine guard 59g form the lateral outside thereof is provided as a member separate from the engine guard 59g, only the engine guard cover 59k needs to be replaced when the engine guard cover 59k is damaged, so that repair costs can be reduced. Incidentally, the head cover 54 and the engine guard cover 59k may be engaged without the elastic member interposed therebetween.

Further, the engine guard cover 59k and the head cover 54 are provided substantially in parallel with each other, and the guard body cover 13k and the pillion step 29 are also provided to be in parallel along the vehicle front-rear direction. Accordingly, the periphery around the engine E and the exhaust pipe 55 can have a unique appearance from the side view.

As described above, in the present embodiment, since the guard body 13 is disposed below the pillion step 29 and to protrude laterally from the opening part 56h formed in the exhaust pipe cover 56, a position at which the guard body 13 is provided can be lowered according to an arrangement position of the exhaust pipe 55. Accordingly, a lateral protrusion amount of the guard body 13 can be suppressed. Therefore, for example, it is not necessary to provide a reinforcing structure such as a reinforcing means which includes a double pipe at a base of the guard body 13, the size and weight of the guard body 13 can be reduced and the manufacturing cost of the guard body 13 can be lowered.

Further, since the guard body 13 is disposed below the pillion step 29, the pillion step 29 can be disposed closer to the passenger seat 17p in the front-rear direction, and the pillion step 29 can be made larger. Therefore, a degree of freedom of the arrangement of the pillion step 29 is improved without affecting the arrangement of the guard body 13. Therefore, a structure can be employed in which a riding posture of the passenger can be easily changed while facilitating the getting on and off of the passenger. Further, since the guard body 13 is disposed at a lower side of the vehicle, the gravity center of the vehicle can be lowered.

Further, since the guard body cover 13k covering the guard body 13 from the lateral outside thereof is provided as a member separate from the exhaust pipe cover 56, only the guard body cover 13k needs to be replaced when the guard body cover 13k is damaged, so that repair costs can be reduced. Further, since the guard body cover 13k is fixed to the exhaust pipe cover 56, approach thereto can be easier in assembling, maintenance or the like and workability is better.

Further, the guard body cover 13k covers the guard body 13, so that the guard body 13 is not exposed, which improves the appearance design. Further, since the guard body cover 13k is formed as a separate member, enlargement of the guard body cover 13k and the exhaust pipe cover 56 can be suppressed and size thereof can be reduced as compared with a case where the guard body cover 13k and the exhaust pipe cover 56 are formed integrally. Therefore, the pillion step 29 can be disposed closer to the guard body 13, and a height at which the pillion step 29 is disposed can be kept low. As a result, a getting on and off ability of the passenger can be improved. Further, since the guard body 13 cannot be seen from the outside, surface treatment cost thereof can be saved.

Further, since the saddlebag 40 which can accommodate luggage is disposed rearward and upward of the guard body cover 13k, the exhaust pipe 55 and the saddlebag 40 can be protected by the guard body 13 and the guard body cover 13k. Further, a plurality of portions can be protected with the guard body 13 and the guard body cover 13k, so that there is no need to provide protection means unnecessarily. Accordingly, an inexpensive structure can be obtained.

Further, since the heights of the pillion step 29 and the guard body 13 are different in the upper-lower direction, the saddlebag 40 can be enlarged to the front side and can accommodate more luggage.

Further, since the guard body cover 13k is formed of a different color and material (for example, formed of resin) from the exhaust pipe cover 56 (for example, formed of metal), a periphery of the exhaust pipe can be configured to be a unique appearance.

Further, since the guard body cover 13k is elastically supported on the exhaust pipe cover 56 via the elastic member 14, a buffering function can be provided between the guard body cover 13k and the exhaust pipe cover 56, and the exhaust pipe cover 56 can be prevented from being plastically deformed when an external force is applied to the guard body cover 13k. Therefore, a protection performance of the exhaust pipe cover 56 is improved.

Further, the exhaust pipe connecting portion 57 having a diameter smaller than that of the expansion chamber 58 is connected to the front surface 58f of the expansion chamber 58, and the guard body 13 laterally extends below the upper side 58u of the expansion chamber 58 and above the exhaust pipe connecting portion 57, so that the guard body 13 can be disposed by utilizing the space S formed by the exhaust pipe 55. As a result, parts can be disposed in a concentrated manner.

Further, since the guard body 13 and the exhaust pipe 55 are disposed to be as close as possible, the attachment position of the guard body 13 can be lowered and the lateral protrusion amount of the guard body 13 can be suppressed. As a result, a large protrusion amount of the guard body 13 is not necessary. Therefore, for example, it is not necessary to provide a reinforcing structure such as a reinforcing means which includes a double pipe at a base of the guard body 13, the size and weight of the guard body 13 can be reduced and the manufacturing cost of the guard body 13 can be lowered.

Although one embodiment of the present invention has been described above, the present invention is not limited to the embodiment and can be modified as appropriate.

In the above embodiment, although the guard body 13 is formed in a Y shape in a plan view, the guard body 13 may have, for example, a U shape, or any other appropriate shape.

Further, the supporting structure of the guard body cover 13k may be other attachment structures using the fastening portion 13t. Further, the shape of the guard body cover 13k is also not limited to the shape of the above embodiment and may be changed appropriately according to the shape and size of the guard body 13.

Further, the engagement structures between the elastic member 14 and the opening part 56h and between the elastic member 14 and the guard body cover 13k are not limited to the structure shown in FIG. 8, and the structure may be changed appropriately as long as the elastic member 14 is interposed between the guard body cover 13k and the exhaust pipe cover 56. Further, the guard body cover 13k and the exhaust pipe cover 56 may be configured to be engaged with each other as resin members.

Further, in the above embodiment, although the driver seat 17 and the passenger seat 17p are separated with a step therebetween, the driver seat 17 and the passenger seat 17p may have an integral seat structure instead of the above structure.

Furthermore, although a motorcycle has been described in the above embodiment, the present invention may be employed as a three-wheeled or four-wheeled saddle-type vehicle.

DESCRIPTION OF REFERENCE NUMERALS 1 motorcycle (saddle-type vehicle)
2 vehicle body frame
13 guard body
13k guard body cover
14 elastic member
17p passenger seat
29 pillion step
40 saddlebag 55 exhaust pipe
56 exhaust pipe cover
56h opening part
57 exhaust pipe connecting portion
58 expansion chamber
58f front-lower portion
58u upper side of the expansion chamber
E engine

The invention claimed is:

1. A saddle-type vehicle comprising:
a vehicle body frame;
a pillion step supported by the vehicle body frame and on which a foot of a passenger is to be placed;
a passenger seat supported by the vehicle body frame and on which the passenger is to be seated;
an exhaust pipe configured to guide an exhaust gas discharged from an engine to an outside;
an exhaust pipe cover covering the exhaust pipe from a lateral outside thereof; and
a guard body extending laterally outward from the vehicle body frame,
a guard body cover covering the guard body from a lateral outside thereof,
wherein a saddlebag which is configured to accommodate luggage is disposed rearward and upward of the guard body cover,
wherein the guard body is disposed below the pillion step,
wherein the guard body and the guard body cover are disposed to protrude laterally from an opening part formed in the exhaust pipe cover, and
wherein the guard body and the guard body cover are disposed at a lateral inner side of an outermost end portion of the saddlebag.

2. The saddle-type vehicle according to claim 1, wherein the guard body cover is fixed to the exhaust pipe cover.

3. The saddle-type vehicle according to claim 1, wherein the guard body cover is different from the exhaust pipe cover in color and material.

4. The saddle-type vehicle according to claim 1, wherein the guard body cover is supported on the exhaust pipe cover via an elastic member.

5. The saddle-type vehicle according to claim 1, wherein an expansion chamber is provided on a downstream side of the exhaust pipe,
wherein an exhaust pipe connecting portion having a diameter smaller than that of the expansion chamber is connected to a front-lower portion of the expansion chamber, and
wherein the guard body laterally extends below an upper side of the expansion chamber and above the exhaust pipe connecting portion.

6. The saddle-type vehicle according to claim 1, wherein in a state where the guard body cover is removed, the saddle-type vehicle can be fixed with using a locking portion provided at a tip end portion of the guard body.

* * * * *